(12) United States Patent
Isaksson et al.

(10) Patent No.: US 6,452,469 B1
(45) Date of Patent: Sep. 17, 2002

(54) SWITCHING DEVICE

(75) Inventors: Dan Isaksson, Jeppo; Eero Pasanen; Leo Palomaki, both of Vaasa, all of (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 09/984,278

(22) Filed: Oct. 29, 2001

(51) Int. Cl.$^7$ ................................................ H01H 3/60
(52) U.S. Cl. ........................ 335/157; 335/158; 335/191
(58) Field of Search ........................... 335/156, 157, 335/158, 185–195

(56) References Cited

U.S. PATENT DOCUMENTS

| | | | | |
|---|---|---|---|---|
| 4,400,670 A | * | 8/1983 | Mostosi | 335/6 |
| 5,619,076 A | | 4/1997 | Layden et al. | 307/48 |

* cited by examiner

Primary Examiner—Ramon M. Barrera
(74) Attorney, Agent, or Firm—Oliff & Berridge, PLC

(57) ABSTRACT

The present invention relates to a switching device (14) which is arranged to switch a load (12) to a direct voltage circuit (13). The switching device (14) comprises a switching member (14a) consisting of at least three contacts (7,8,9), a control member (10) which controls the contacts (7,8,9) of the switching member (14a) and has the positions open [0] and closed [1], and one or more spring members (16a, 16b) which are tensioned by the control member (10) and control the contacts. The switching device is characterized in that the switching member (14a) of the switching device (14) comprises a limiter arrangement which is arranged to limit closing of at least one contact (7) when the control member (10) is turned from the open [0] position into the closed [1] position, the limiter arrangement comprising a limiter (1) and a toggle joint (17) connected thereto and a solenoid (4) arranged in the toggle joint, the toggle joint (17) being arranged to be controlled by the solenoid (4), as a result of which the toggle joint (17) turns the limiter (1) so that it releases the contact (7) of the switching member (14a) whose closing has been prevented, allowing the contact to close.

9 Claims, 6 Drawing Sheets

SWITCHING DEVICE

FIELD OF THE INVENTION

The invention relates to a switching device which is arranged to switch a load to direct voltage. The switching device of the invention is used in applications where a high capacitive load is switched to direct voltage, in which case the charging current of the capacitive load needs to be limited.

BACKGROUND OF THE INVENTION

A system which has a high capacitive load and is connected to a direct current circuit has to be protected during voltage switch-on. If the capacitors of the system are not charged, sudden switch-on of direct voltage generates a surge current, which may damage system components switched behind the switch. Usually the system is protected by using a three-position and three-pole switching device which supplies the charging current of the capacitive load through a charging resistor to the load during charging. The charging resistor limits the charging current and prevents problems that sudden charging may cause in the system. After charging the charging resistor is bypassed by switching the load directly to direct voltage. An example of a device with a high capacitive load is a frequency converter/converters which is/are switched to a direct voltage supply circuit.

One prior art solution is shown in FIG. 7. This solution employs a manual three-position switching device for switching a high capacitive load to direct voltage. The switching device comprises a three-position control member which is controlled by turning the handle attached to the control shaft of the control device. During charging the current is supplied to charging resistors via an array of auxiliary contacts. The positions of both the switching device and the control member are Open [0], Charging [C] and Closed [1]. Turning of the control member and the switch from the switching position into the closed position is prevented by a limiter, such as a magnetic switch. The control member and the switch cannot be turned into the closed position until the limiter allows this. The operation of the limiter is controlled by a separate control signal, which is dependent on the charging state of the capacitive load.

A problem related to the prior art switching device is that the control device of the switching device has three positions and an array of auxiliary contacts. This means that controlling of the switching device includes a phase which is unnecessary for switching, i.e. charging phase, which requires that the person performing switching manually keeps the switching device in the charging [C] position until the limiter allows turning of the switch into the closed [1] position. This makes switching more difficult and involves the risk of misuse of the switching device if the person performing switching is unfamiliar with the special functions of the switching device. Secondly, the array of auxiliary contacts comprises a large number of moving mechanical parts which are easily damaged.

BRIEF DESCRIPTION OF THE INVENTION

The object of the present invention is to eliminate disadvantages of the prior art by providing an improved switching device where the operation of the switching member corresponds to that of a three-position switching device but whose structure provides a two-position control device with only the positions open [0] and closed [1]. In that case the use of the switching device in switching is considerably more natural to switch of this kind as well as more reliable and safer.

This is achieved by a switching device which is characterized by what is disclosed in the claims.

The switching device is arranged to switch a load to a direct voltage circuit. It comprises a switching member consisting of at least three contacts, a control member which controls the contacts of the switching member and has the positions open [0] and closed [1], one or more spring members which control the contacts and are tensioned by the control member, and the switching device is characterized in that the switching member of the switching device comprises a limiter arrangement which is arranged to limit the closing of at least one contract when the control member is turned from the open [0] position into the closed [1] position, the limiter arrangement comprising a limiter, a toggle joint connected thereto and a solenoid arranged in the toggle joint, which is arranged to be controlled by the solenoid, as a result of which the toggle joint turns the limiter so that it releases the contact of the switching member whose closing has been prevented, allowing the contact to close.

The preferred embodiments of the invention are disclosed in the dependent claims.

For charging a capacitive load, the switching device is provided with a limiter arrangement, i.e. a mechanism which limits the movement of the third contact of the switching device when the control device is turned from the open [0] position into the closed [1] position and prevents the third contact of the switching member from closing when the control device is turned. The mechanism leaves the contact open to wait for release in an excited state generated by spring force. The contact is released after a certain charging state of the capacitive load has been reached.

The mechanism consists of a limiter, which is preferably a lever arm, and of a toggle joint attached thereto. The first end of the lever arm is connected to the toggle joint and the second end is connected to the control member of the third contact in the switching device. The toggle joint comprises a fold where an electrically-controlled solenoid is arranged. The solenoid generates a pulse in the fold of the toggle joint so that the toggle joint can be folded and the spring tension released, which allows the third contact to close.

In an embodiment the joint at the first end of the limiter, where the limiter is connected to the shaft of the control device, comprises a clearance. The clearance allows the shaft to rotate by a certain angle without moving the limiter. This way the spring member of the switching device is tensioned for release but turning of the shaft does not influence the position of the limiter. The clearance is preferably implemented as follows: the first end of the limiter, where the limiter is connected to the shaft of the control device, is provided with an opening through which the shaft is guided. The opening is shaped to allow rotation of the shaft by a certain angle without moving the limiter, as a result of which the spring member of the switching device is tensioned for release without the turning of the shaft affecting the position of the limiter.

In another embodiment all contacts of the switching device are controlled by a common shaft. In that case the necessary clearance can be implemented by controlling the first and the second contact with a common shaft. At the third contact the shaft comprises a connecting sleeve for implementing the clearance.

A sensor, such as a voltage sensor, is arranged to sense the charging state of the capacitive load and to control the solenoid.

The switching device of the invention thus has three operating positions, i.e. open [0], charging [C] and closed [1], whereas the control member of the switching device preferably has only two positions, i.e. open [0] and closed [1]. This makes the switching device simple and safe to use since the control member of the switching device needs to be turned only between the open [0] position and the closed [1] position thanks to the fact that the mechanism of the invention provides the switching device with automatic operation for controlling the operation of the switching device between the positions charging [C] and closed [1].

A further advantage of the solution is that no auxiliary contacts are needed in the switching device implemented according to the invention, and consequently the structure of the device is simpler and more reliable.

BRIEF DESCRIPTION OF THE FIGURES

In the following, the invention will be described in greater detail by means of the accompanying drawings, in which.

DETAILED DESCRIPTION OF THE INVENTION

An example of the structure and function of a preferred embodiment of the typical switching device according to the invention will be described with reference to FIGS. 1 to 6.

Figure 1:
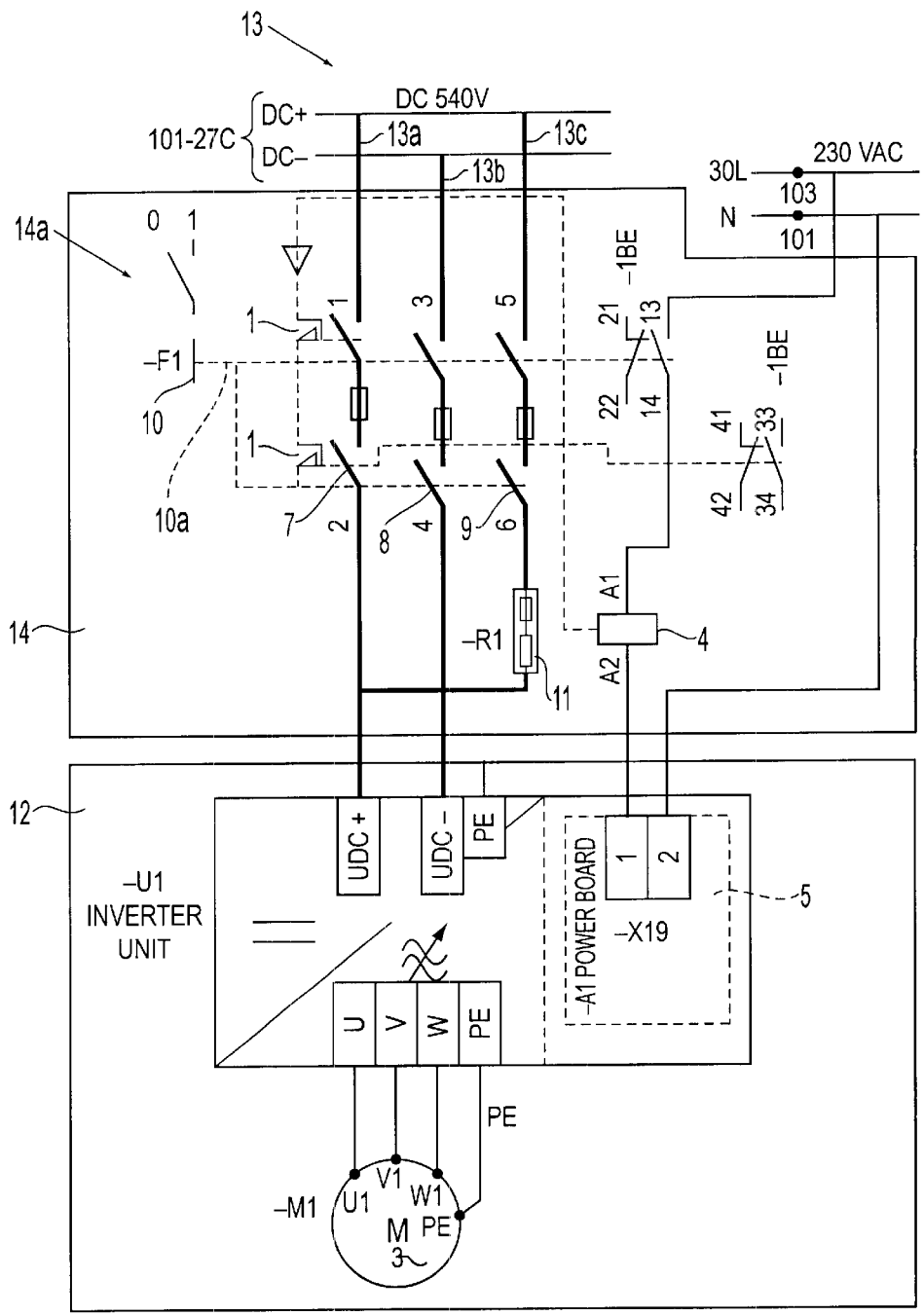
FIG. 1 is a wiring diagram of the frequency converter output, showing a switching device according to the invention, FIG. 2 schematically illustrates the limiter mechanism of the third contact in the switching device 1 according to FIG. 1 when the switch is in the open position, FIG. 3 schematically illustrates the limiter mechanism of the third contact in the switching device 1 according to FIG. 1 when the switch is in the charging position, and FIG. 4 schematically illustrates the limiter mechanism of the third contact in the switching device 1 according to FIG. 1 when the switch is in the closed position.

According to FIG. 1, the switching device 14 comprises a switching member 14*a*, which consists of contacts 7, 8, 9, which are closed and opened by turning the handle 6 of the control member 10 of the switching device 14. The switching device 14 is arranged between a direct current circuit 13 and a load 12. The load 12 is e.g. a frequency converter which drives an electric motor. The switching device 14 is thus arranged to switch the load 12 to the direct voltage 13.

The switching device 14 includes a switching member 14*a* consisting of three closable contacts 7, 8, 9. Naturally the number of the contacts can be larger than three if the application requires more contacts. The first contact 8 is arranged to connect the negative pole 13*c* of the direct voltage circuit 13 to the load. The second contact 9 is arranged to connect the positive pole 13*b* of the direct voltage circuit 13 to the load 12 via a charging resistor 11 connected in parallel with the contact 9. The third contact 7 is arranged to connect the positive pole 13*a* of the direct voltage circuit 13 to the load 12 after a delay.

The contacts 7,8,9 of the switching member 14*a* are controlled by a control member 10, which comprises a control shaft 10*a* whose one end is provided with a handle 6. Depending on the embodiment, the control shaft 10*a* may comprise one or more shafts and mechanical components for providing the shaft with clearances needed in this type of embodiments. Closing and opening of the contacts 7,8,9 of the switching member 14*a* is controlled by spring members 16*a* and 16*b*, which are tensioned when the control member 10 is turned either into the open position or into the closed position, and the spring members 16*a*, 16*b* are arranged to be released as the handle 6 of the control member 10 reaches either the closed or the open position of the switch, thus causing sudden closing or opening of the contacts 7,8,9 of the switching member 14*a*. In that case the control shaft 10*a* is connected to the spring members 16*a*, 16*b* e.g. via a cam 20 and turning of the shaft 10*a* presses the spring of the spring member 16*a*, 16*b* together if it is a coil spring and thus the spring 16*a*, 16*b* is tensioned. When the cam 20 revolves past its dead centre, the spring 16*a*, 16*b* is released and it closes or opens the contact.

Figure 2:
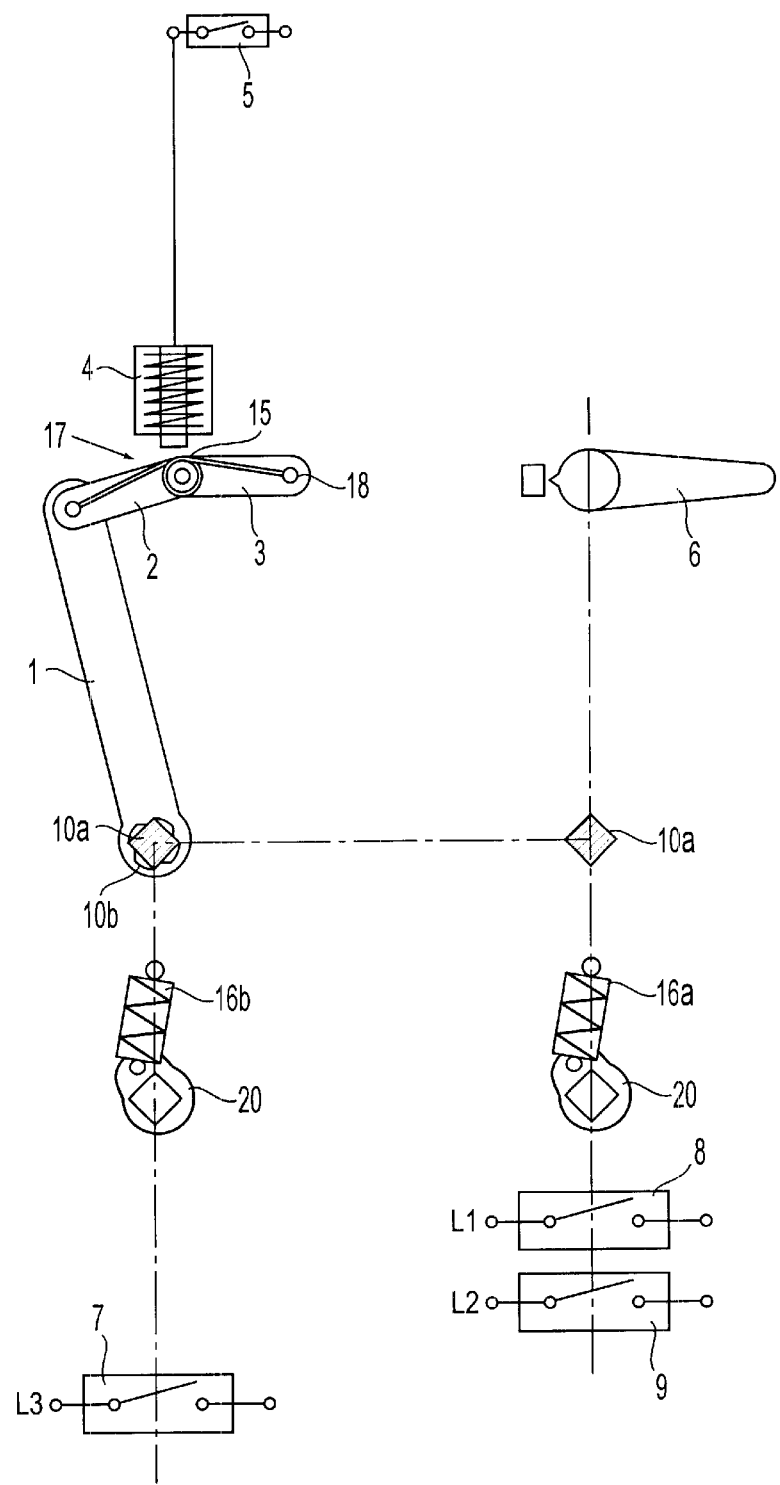
Figure 3:
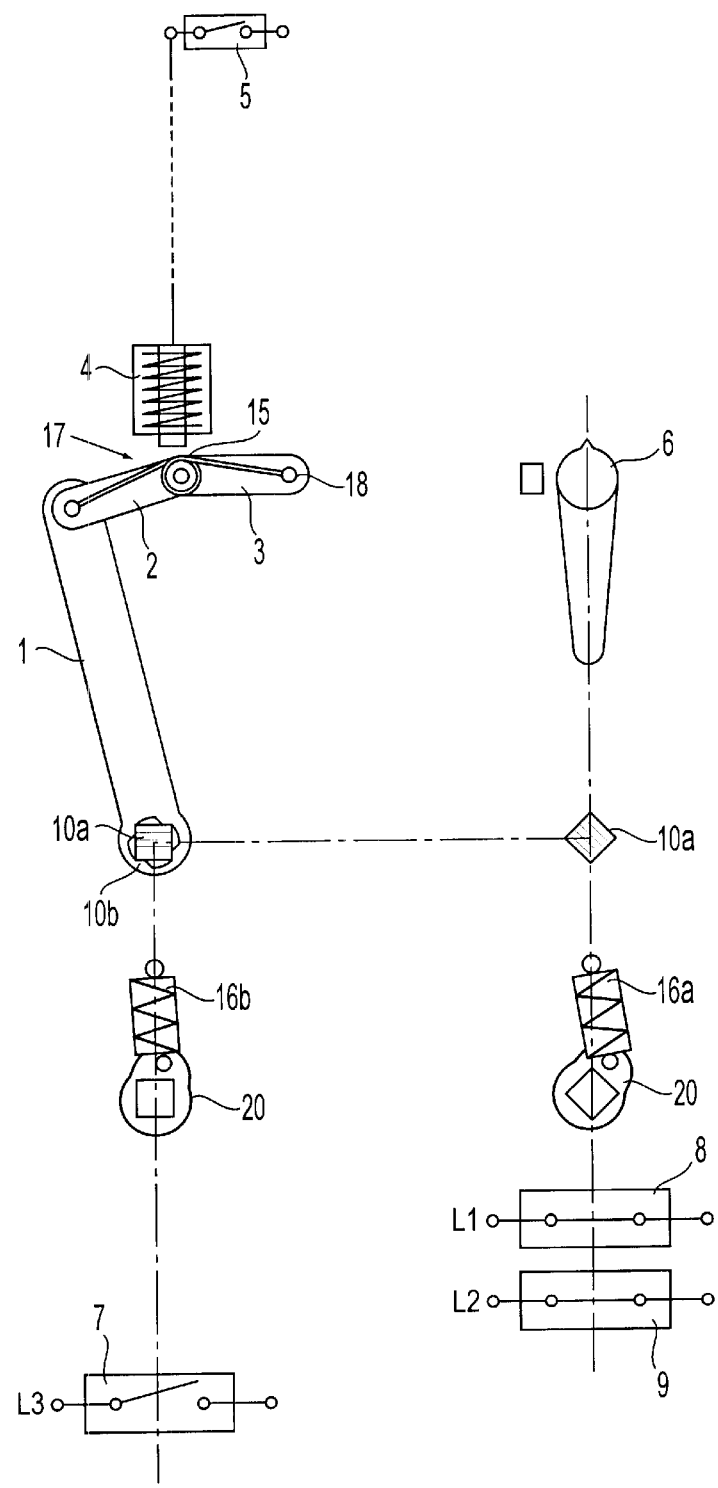
Figure 4:
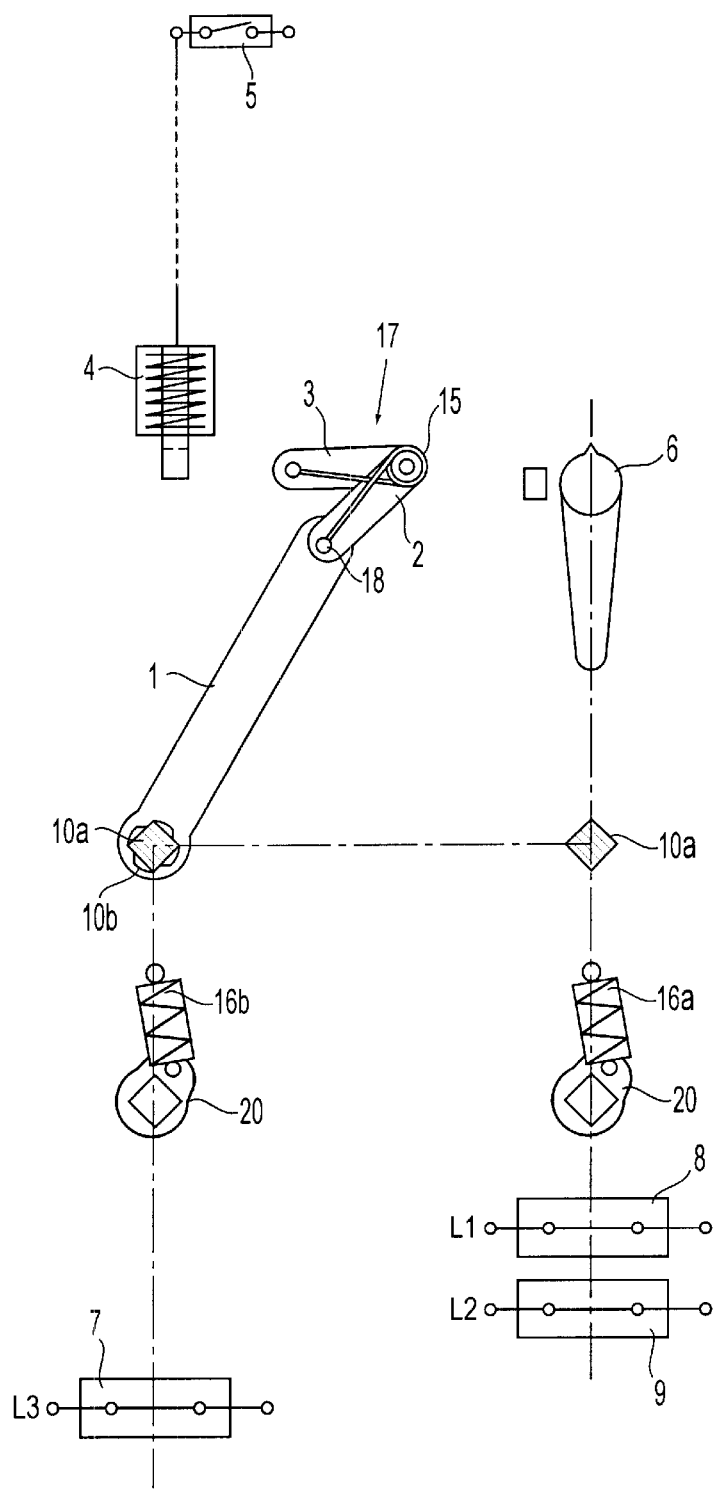
Figure 5:
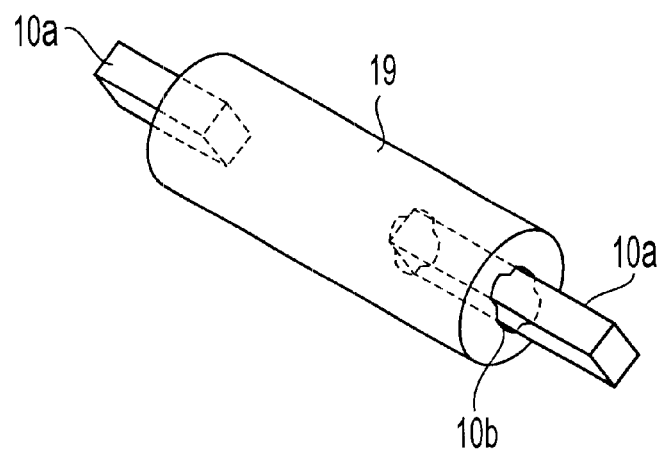
FIG. 5 illustrates the structure of the sleeve for providing the shaft controlling the contacts of the switching device with a necessary clearance for limiting closing of the third contact, FIG. 6 schematically illustrates an embodiment for providing the clearance between the limiter of the limiter mechanism and the control member in the third contact of the switching device according to FIG. 2.

The switching device 14 has three operating phases, including the following positions: open [0], charging [C] and close [1]. The control member 10 of the switching device 14, on the other hand, has two operating phases, including the positions open [0] and closed [1]. Thus a two-phase control member 10 is used for controlling a three-phase switching device 14. For this purpose the switching device 14 is, according to FIGS. 2 to 4, provided with a mechanism which limits closing of the third contact 7 of the switching member 14*a* when the control member 10 is turned from the open [0] position into the closed [1] position and prevents closing of the contact 7 due to turning of the control member 10. The mechanism leaves the contact 7 open to wait for external release in an excited state.

According to an embodiment, the mechanism consists of a limiter 1, which is preferably a lever arm 1, and of a toggle joint 17 connected thereto. The first end of the limiter 1 is connected to the shaft 10*a* of the control member 10 and the second end to the first end of the first lever arm 2 of the toggle joint 17. The second end of the first lever arm 2 of the toggle joint 17 is connected to the first end of the second lever arm 3, in which case a fold 15 is formed in the toggle joint 17 at this point. The second end of the second lever arm 3 of the toggle joint 17 is attached to a fixed supporting point 18 by means of bearings. An electrically controlled solenoid 4 is arranged in the fold 15 of the toggle joint 17, the solenoid being arranged to generate an impulse, such as a strike, in the fold 15 of the toggle joint 17.

Figure 6:
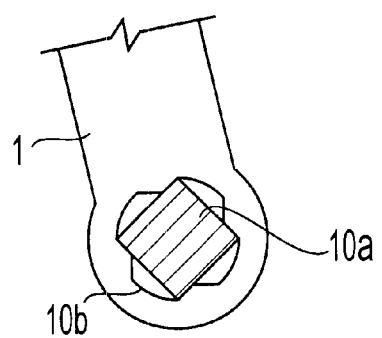
Figure 7:
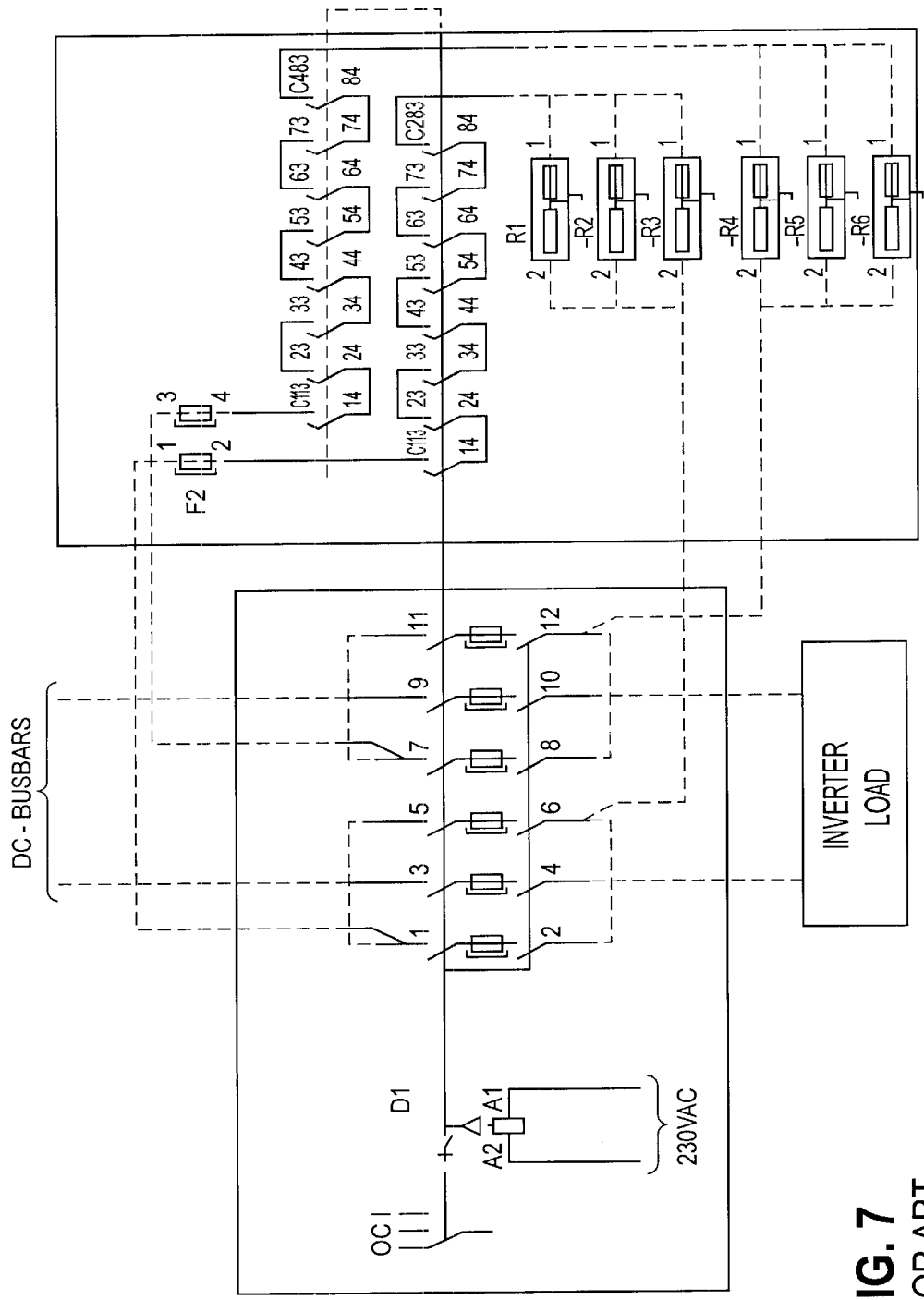
FIG. 7 illustrates a prior art switching device which comprises a three-phase control device and a charging circuit.

According to FIG. 6, the operation of the limiter 1 is based on the fact that the joint at the first end of the limiter 1 for connecting the limiter 1 to the shaft 10*a* of the control member 10 comprises a clearance. This clearance is implemented e.g. by providing the first end of the limiter 1, where the limiter 1 is connected to the shaft 10*a* of the control member 10, with an opening 10*b* through which the shaft 10*a* is guided. The opening 10*b* is shaped to allow the shaft 10*a* to rotate by a certain angle to tension the spring member 16*b* without the turning of the shaft 10*a* moving the limiter 1. One way of implementing clearance of this kind is to use a shaft 10*a* with a quadrangular cross-section and a cross-shaped opening 10*b* with rounded edges in the limiter 1 as shown in FIG. 4. In that case the shaft 10*a* is connected to the spring member 16*b* by a cam 20, for example, and turning of the shaft 10a presses the spring member 16b together if the spring member is a coil spring, thus tensioning the spring 16b. At the third contact 7 the limiter 1, however, limits the movement of the cam 20 to a point where the cam has revolved slightly past its upper dead centre, in which case the spring member 16b cannot release the contact 7 into the closed position. It is not until the solenoid 4 arranged in the fold 15 of the toggle joint 17 generates a release impulse in the fold 15 of the toggle joint 17 that the toggle joint 17 folds and the spring 16b is released, thus closing the contact 7.

In another embodiment all contacts 7,8,9 of the switching device are controlled by a common shaft 10a. In that case the necessary clearance can be implemented by controlling the first contact 8 and the second contact 9 by a common shaft and by providing the shaft 10a at the third contact 7 with a connecting sleeve 19 of FIG. 5 for providing the clearance. The shaft 10a from the first and the second contact to the first end of the sleeve 19 is e.g. quadrangular and the sleeve 19 is provided with a quadrangular receiving member for receiving the shaft end, the shape of the member corresponding to that of the shaft 10a. Correspondingly, the second end of the sleeve 19 is provided with a cross-shaped receiving member 10b with rounded edges for receiving the quadrangular shaft 10a, which controls the third contact. This clearance implemented by the sleeve 19 allows the shaft 10a to rotate by a certain angle to tension the spring member 16b without the turning of the shaft 10a moving the limiter 1. Otherwise the embodiment functions in the same way as the one described above.

The switching device 14 functions as follows: In the initial situation the handle 6 of the control member 10 of the switching device 14 is in the open [0] position according to FIG. 2. All contacts 7,8,9 of the switching member 14a are open. When the control member 10 of the switching device 14 is turned into the closed [1] position according to FIG. 3, the first contact 8 and the second contact 9 of the switching member 14a close simultaneously. The first contact 8 connects the load 12 to the negative pole 13b of the direct voltage circuit 13. A resistor 11 is connected in parallel with the second contact 9 to restrict the current in the circuit. The second contact 9 connects the load 12 to the positive pole 13c of the direct voltage circuit 13 through the resistor 11. At the third contact 7 turning of the shaft 10a into the closed [1] position tensions the spring member 16b. The limiter 1, however, limits release of the third contact 7 into the closed position. The device that constitutes the load 12 comprises a sensor 5, such as a voltage sensor, which senses the voltage of the load 12 capacitance and thus the charging state. When the charging state reaches a predetermined level, the sensor 5 gives a switching signal to the solenoid 4 e.g. by closing the contact 5, which switches voltage to the solenoid 4 and thus the solenoid 4 generates an impulse in the fold 15 of the toggle joint 17 and releases the spring 16b. In that case the toggle joint 17 folds as shown in FIG. 4, releasing the limiter 1 that limits the closing of the third contact 7 of the switching member 14a. Consequently, the third contact 7 closes and switches the positive pole 13a of the direct voltage circuit 13 to the load 12 of the second current path in parallel with the current path that comprises the charging resistor 11. In the final situation all three contacts 7,8,9 are thus closed.

The load 12 is switched off from the direct voltage circuit as follows: In the initial situation the handle 6 of the control member 10 in the switching device 14 is closed [1]. All contacts 7,8,9 of the switching member 14a are closed. The control member 10 of the switching device 14 is turned into the open [0] position. The contacts 7,8,9 of the switching member 14a open simultaneously and switch off the load 12 from the direct voltage circuit 13.

If the handle 6 of the control member 10 in the switching device 14 is turned from the closed [1] position back into the open [0] position before the third contact 7 of the switching member 14a has closed, the spring member 16b at the third contact 7 of the switching member is released without releasing the contact 7 and the contacts 8,9 of the switching member 14a open simultaneously and disconnect the load 12 from the direct voltage circuit 13.

It is to be understood that the above description and the related drawings are only intended to illustrate the invention. Thus the invention is not limited only to the above description or to the embodiment disclosed in the claims, but it is obvious to a person skilled in the art that the invention can be varied and modified in several ways within the inventive concept defined in the appended claims.

What is claimed is:

1. A switching device which is arranged to switch a load to a direct voltage circuit, comprising:

a switching member consisting of at least three contacts, a control member which controls the contacts of the switching member and has the positions open [0] and closed [1], one or more spring members which are tensioned by the control member and control the contacts, the switching member of the switching device comprising a limiter arrangement which is arranged to limit closing of at least one contact when the control member is turned from the open [0] position into the closed [1] position, the limiter arrangement comprising a limiter and a toggle joint connected thereto and a solenoid arranged in the toggle joint, the toggle joint being arranged to be controlled by the solenoid, as a result of which the toggle joint turns the limiter so that it releases the contact of the switching member whose closing has been prevented, allowing the contact to close.

2. A switching device according to claim 1, wherein the first contact of the switching member is arranged to connect the negative pole of the direct voltage circuit to the load, the second contact being arranged to connect the positive pole of the direct voltage circuit to the load via a resistor connected in parallel with the contact, and the third contact being arranged to connect the positive pole of the direct voltage circuit to the load after a delay.

3. A switching device according to claim 1, wherein the first end of the limiter is connected to the shaft of the control member and the second end of the limiter is connected to the first end of the first lever arm of the toggle joint and the second end of the first lever arm is connected to the first end of the second lever arm, whereby a fold of the toggle joint forms at the joint, and the second end of the second lever arm of the toggle joint is attached to a fixed supporting point with bearings.

4. A switching device according to claim 3, wherein the joint of the first end of the limiter, where the limiter is connected to the shaft of the control member, comprises a clearance.

5. A switching device according to claim 4, wherein at the first end of the limiter, where the limiter is connected to the shaft of the control member, there is an opening through which the shaft is guided, the opening being shaped to allow rotation of the shaft by a certain angle to tension the spring member without turning the limiter of the shaft.

6. A switching device according to claim 3, wherein said solenoid is an electrically-controlled solenoid arranged in the fold of the toggle joint, the solenoid being arranged to generate an impulse in the fold of the toggle joint, as a result of which the toggle joint folds and releases the limiter so that it can turn and release the spring member, thus closing the contact.

7. A switching device according to claim 6, wherein a sensor is arranged to sense the charging state of the load and control the solenoid.

8. A switching device according claim 1, wherein the limiter is a lever arm.

9. A switching device according to claim 1, wherein the switching device has three operating positions: open [0], charging [C] and closed [1].

* * * * *

UNITED STATES PATENT AND TRADEMARK OFFICE
CERTIFICATE OF CORRECTION

PATENT NO.    : 6,452,469 B1
DATED         : September 17, 2002
INVENTOR(S)   : Dan Isaksson et al.

It is certified that error appears in the above-identified patent and that said Letters Patent is hereby corrected as shown below:

<u>Title page,</u>
Insert item:

-- [30]  Foreign Application Priority Data
         October 31, 2000 (FI)...20002398 --

Signed and Sealed this

Twenty-ninth Day of April, 2003

JAMES E. ROGAN
*Director of the United States Patent and Trademark Office*